Patented Oct. 18, 1949

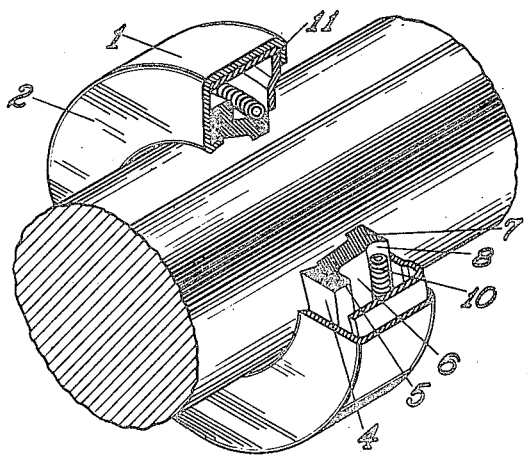
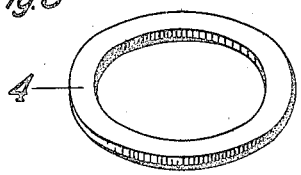
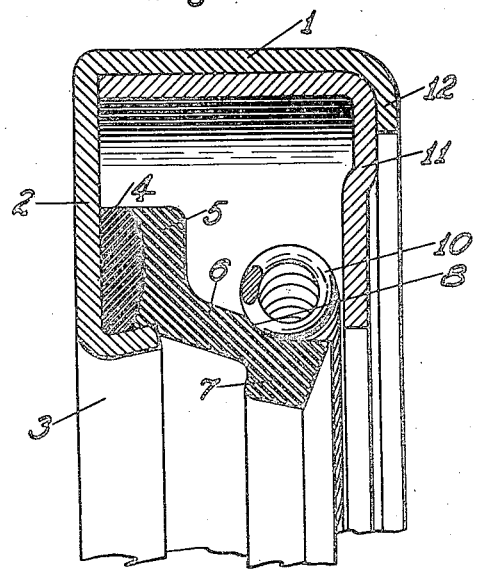

2,485,011

UNITED STATES PATENT OFFICE 2,485,011

FLUID SEAL

Paul F. Niessen and Robert G. Welk, Chicago, Ill., assignors to Victor Manufacturing & Gasket Co., Chicago, Ill., a corporation of Illinois Application January 30, 1947, Serial No. 725,182

2 Claims. (Cl. 288—3)

This invention relates to shaft sealing devices and has for its principal object the provision of a new and improved sealing device of this kind.

It is a main object of the invention to provide in a sealing device a new and improved sealing element composed entirely of a compounded elastomer.

Another object of the invention is to provide a sealing element that can be manufactured at low cost without sacrificing quality.

Still another object of the invention is to provide a sealing element that is capable of forming and maintaining a fluidtight seal between the element and its casing.

Further objects of the invention not specifically mentioned here will be apparent from the detailed description and claims which follow, reference being had to the accompanying drawings in which Fig. 1 is a view showing an isometric projection showing the seal applied to a shaft, with certain parts cut away the better to show the invention;

Fig. 2 is a cross sectional view through the seal, drawn to an enlarged scale;

Fig. 3 is a perspective view of the base of the sealing element; and

Fig. 4 is a cross sectional view through the element.

It is old in the prior art to provide as a seal for a rotating shaft that projects through a stationary housing, a unitary structure consisting of an outer shell, usually composed of metal and adapted to remain stationary in the housing. This shell encircles the shaft and carries within it a sealing element fixed in the shell and embracing the shaft to prevent fluid from traveling along the shaft and out of the housing.

In these prior art seals, the sealing element has been usually composed of a grease resistant compounded elastomer that encompasses or partially encompasses a metal annulus by which the element is mounted in the shell. the shell containing an inner flange encircling the shaft, and by which the element is maintained in place in the shell. Most generally in the prior art devices, this inner flange has been expanded radially outwardly to apply tension to the element, and in some cases to expand the metal annulus, thereby to securely bind the element in the shell. This outward distorting of the metallic annulus has usually warped the same and various arrangements have been employed to counteract this warping.

The present invention, while it relates to seals of the type found in the prior art, improves upon this prior art by eliminating entirely the metal annulus encompassed by or embedded in the elastomer of the sealing element, substituting therefor a compounded elastomer that is relatively harder and less elastic than the shaft-engaging portion of the sealing element. Although the base portion of the sealing element is composed of a relatively inelastic compounded elastomer, it is nevertheless somewhat flexible and capable of being expanded radially, as the inner flange of the shell is forced outwardly, without warping, with the result that the sealing element readily forms and maintains a fluidtight seal with the shell. The compounded elastomer in the base of the sealing element must be composed of material to which the softer compounded elastomer in the shaft-engaging portion of the element can be securely bonded, preferably by vulcanizing, with the result that the two become so firmly fixed together as to constitute practically a single unit.

Referring now to the drawings in more detail. The sealing element of the present invention consists of a shell preferably composed of metal and having an outer cylindrical wall 1, from one end of which a flat annular wall 2 projects radially inwardly, this wall terminating in a flange 3 which initially is cylindrical and concentric with the outer wall 1. The sealing element comprises an annulus 4 composed of any suitably compounded elastomer which, after vulcanization, has a durometer hardness of 95 points or more when tested on a Shore type A durometer, a butadiene co-polymer, for example. Vulcanized to this base 4 is a softer grease resistant compounded elastomer unit similar to the units of the prior art and having a base-engaging portion 5, a frusto-conical portion 6, and a shaft-engaging portion 7, which shaft-engaging portion contains in its outer periphery a recess 8 adapted to receive a tensioning device, as will presently appear. The compounded elastomer used in this latter element is relatively softer and more elastic than that of the base 4, preferably having a hardness of from 75 to 85 points when tested on a Shore type A durometer.

While we have differentiated between the materials in the annulus 4 and the sealing element 7 by giving their relative hardness factors, we have done so for convenience only. The sealing element should be relatively elastic and capable of elongating 150% or more, and the annulus 4 is relatively inelastic, being capable of elongating approximately 50%. The relative elasticity of the members is the important and controlling factor rather than hardness; however, in most compounded elastomers, an increase in hardness is accompanied by a decrease in elasticity and therefore the hardness factors are convenient for defining the characteristics of the materials.

In forming these elements 4 to 8, inclusive, the ring 4 is punched from a sheet of uncured compounded elastomer which is put in a suitable mold, together with a sufficient quantity of the softer compounded elastomer to form the elements 5 to 8, inclusive, and the mold then closed and maintained closed under heat and pressure to cure the elastomers, this heat and pressure bonding the two compounded elastomers together to form a single unitary structure. The particular compositions of the compounded elastomers from which elements 4 and 5 are made is not of the essence of the present invention as there are several compositions that may be used, and the particular composition used will depend upon the characteristics of the fluid to be retained. So long as the materials are highly resistant to the particular fluid encountered and are capable of being bonded together by heat and pressure, the requirements of the invention are fulfilled.

It will be noted in Fig. 4 that the inner edge of the sealing unit adjacent the base 4 is cylindrical as shown at 9, to form a seat against which the cylindrical flange 3 may be firmly seated. The diameter of this seat 9 is slightly more than the outside diameter of the flange 3 to permit slipping the seat over the flange during assembly. After the element is so placed in the shell, the flange 3 is rolled radially outwardly into frusto-conical configuration and into firm engagement with the seat 9 in the element, this movement of the flange expanding the base portions of the element radially outwardly. This results in placing the base portion of the sealing element under tension bearing against the outer inclined surface of the flange 3, this tension tending to move the base portion of the element to the left (Fig. 2) into tight seal-forming engagement with the flat wall 2 of the shell, thereby forming a fluid-tight joint between the two elements.

As will be seen in Fig. 4, the inner face of the shaft-engaging portion 7 of the sealing element lies on the surface of a cone whose base is towards the base members 4 and 5 of the element. This conical surface has an inside diameter slightly smaller than the outside diameter of the shaft that the element is adapted to engage, with the result that when the element is engaged with the shaft, as shown in Fig. 1, stresses are set up in the frusto-conical portion 6 of the sealing element and transmitted thereby to the base-engaging portion 5, which stresses resist any tendency of the bases 4 and 5 of the element to warp away from the flat wall section 2. Although similar stresses have been set up in the elastomers of prior art seals, because of the metal washer embedded in the bases thereof, other means have been necessary to counteract the warping of the washers since the stresses in the elastomers have not been sufficiently powerful. Because of the greater elasticity of the base of the element of the present invention, these stresses may be used to advantage.

As will be seen in Fig. 2, a suitable tensioning device, such as the garter spring 10, is placed around the outer portion of the sealing element and registered with the seat 8 therein, and this spring is held in place in the shell by a suitable inner wall member 11 which, in turn, is held in place in the shell by the overturned edge portion 12 of the outer wall 1. The device so constructed is unitary and may be readily handled, without danger of dislodging its component parts.

The seal of the present invention may be used in connection with a wide variety of fluids. Throughout the foregoing description, the compounded elastomers have been described as grease resistant, sealing oils being one of the uses to which the seal can be put. Water, gas, acids, and alkalies may also be sealed with it. The composition of the elastomers will be determined by the fluid to be sealed, and the use of natural rubber, butadiene co-polymer, chloroprene, or mixtures of these compounds with co-polymer materials known as plastics, is contemplated.

Preferably the shell is made of metal, but here again the choice of material used is governed by the fluid to be sealed. In the case of acids, an acid resistant stainless steel or plastic will be used in the shell.

The present invention possesses many advantages. By employing compounded elastomers of two relative hardnesses and elasticity, a simple and efficient sealing unit can be manufactured at low cost; and when nested in a shell and expanded radially outwardly therein, the elasticity of the element forms a fluid-tight seal and no additional sealing aids are necessary. The compounded elastomer used in the base is of itself capable of forming a fluid-tight seal with metal under moderate pressures. The seal so formed may be manufactured at low cost without sacrificing quality.

While we have chosen to illustrate our invention by showing and describing a preferred embodiment of it, we have done so by way of example only, as there are many modifications and adaptations which can be made by one skilled in the art, within the teachings of the invention.

Having thus complied with the statutes, and shown and described a preferred embodiment of our invention, what we consider new and desire to have protected by Letters Patent is pointed out in the appended claims.

What is claimed is:

1. In a fluid seal, a cylindrical shell having an annular wall, a grease retaining member composed of relatively soft resilient grease resistant elastomer, an annulus of relatively harder and less resilient grease resistant elastomer bonded to said grease retaining member and engaging said annular shell wall, and a frusto-conical wall integral with said annular shell wall and engaging said grease retaining member and resilient annulus and expanding the same to hold the annulus in seal-forming engagement with said annular shell wall.

2. In a fluid seal, a retaining shell comprising a cylindrical outer wall and a flat annular wall projecting inwardly from one edge thereof, a sealing element of generally cylindrical configuration composed of a compounded elastomer of approximately 80 points durometer hardness, a base for said sealing element comprising an annulus composed of a compounded elastomer of more than 95 points durometer hardness vulcanized to said sealing element and disposed against said annular wall, and a projection on said wall of frusto-conical configuration engaging said sealing element and base, and expanding the same to force the base into seal-forming engagement with said wall.

PAUL F. NIESSEN.
ROBERT G. WELK.

REFERENCES CITED

The following references are of record in the file of this patent:

UNITED STATES PATENTS

| Number | Name | Date |
|---|---|---|
| 1,630,012 | Hutchinson | May 24, 1927 |
| 2,289,659 | Kosatka | July 14, 1942 |
| 2,405,279 | Victor | Aug. 6, 1946 |

FOREIGN PATENTS

| Number | Country | Date |
|---|---|---|
| 544,881 | Great Britain | 1942 |